US006927899B2

United States Patent
Daigle

(10) Patent No.: US 6,927,899 B2
(45) Date of Patent: Aug. 9, 2005

(54) OPTICAL ELEMENT FOR USE IN CONNECTION WITH RADIATION IN THE INFRARED PORTION OF THE ELECTROMAGNETIC SPECTRUM AND METHOD OF MAKING SAME

(75) Inventor: Marc Daigle, Concord, MA (US)

(73) Assignee: Optical Alchemy, Inc., Maynard, MA (US)

( * ) Notice: Subject to any disclaimer, the term of this patent is extended or adjusted under 35 U.S.C. 154(b) by 0 days.

(21) Appl. No.: 10/325,704

(22) Filed: Dec. 19, 2002

(65) Prior Publication Data

US 2004/0032648 A1 Feb. 19, 2004

Related U.S. Application Data

(60) Provisional application No. 60/403,420, filed on Aug. 14, 2002.

(51) Int. Cl.[7] .............................. G02B 5/20; F21V 9/06
(52) U.S. Cl. ........................ 359/350; 359/361; 359/599
(58) Field of Search ................................ 359/350–361, 359/599; 349/92

(56) References Cited

U.S. PATENT DOCUMENTS 3,722,977 A  *  3/1973  Sloane ....................... 359/350
5,093,735 A  *  3/1992  Doane et al. ................. 349/92
5,206,083 A  *  4/1993  Raj et al. ..................... 428/323
6,433,102 B1 *  8/2002  Suzuki et al. ............ 525/333.3

FOREIGN PATENT DOCUMENTS

JP           54-121754     *  9/1979  ................. 359/350

* cited by examiner

Primary Examiner—Thong Q Nguyen
(74) Attorney, Agent, or Firm—James F. Thompson, Esq.; Chapin & Huang, LLC

(57) ABSTRACT

An optical element, such as a lens, is described that provides good transmission of radiation in the infrared portion of the electromagnetic spectrum, that can be molded using an injection molding technique. The optical element comprises a moldable matrix in which is distributed a plurality of particles. The material comprising the matrix is selected so as to have a relatively low absorption of radiation in the infrared portion of the electromagnetic spectrum, and the material comprising the particles is selected to have a relatively high transmissivity of radiation in the infrared portion of the electromagnetic spectrum, and both materials are selected so as to have approximately the same index of refraction. The optical element comprising the matrix/particle composite is formed to provide surfaces having the contours that are required to provide the desired optical properties.

23 Claims, 1 Drawing Sheet

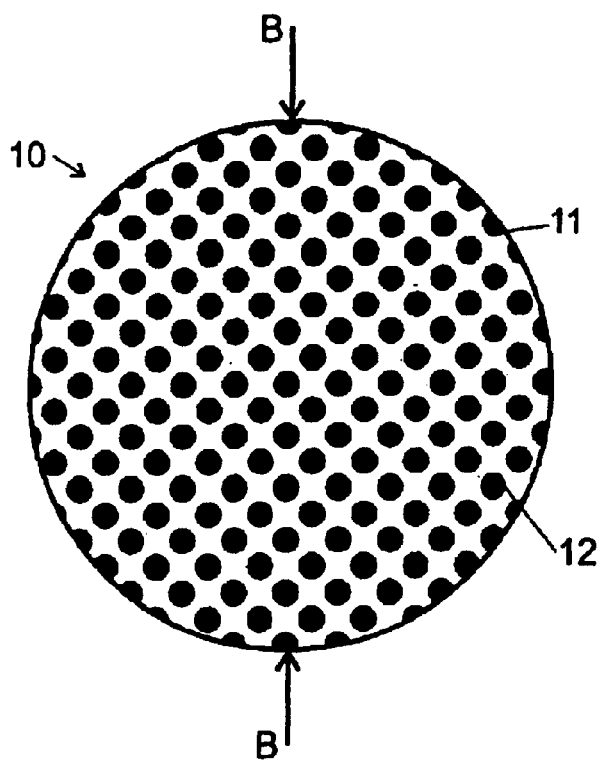
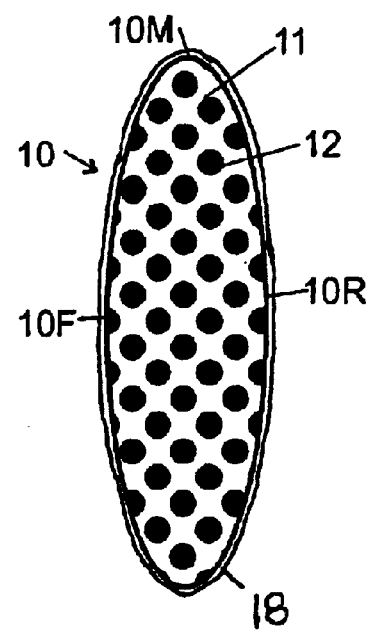
FIG. 1A  FIG. 1B
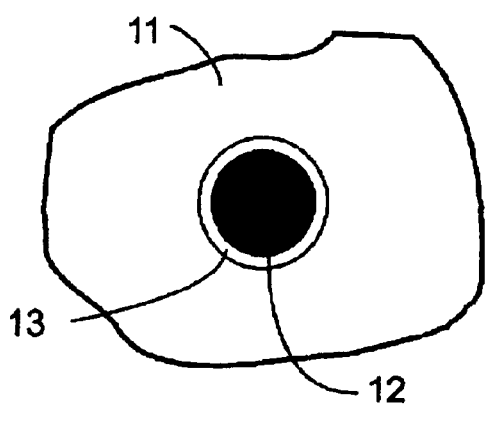
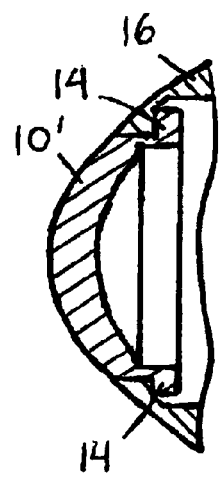
FIG. 1C  FIG. 2

OPTICAL ELEMENT FOR USE IN CONNECTION WITH RADIATION IN THE INFRARED PORTION OF THE ELECTROMAGNETIC SPECTRUM AND METHOD OF MAKING SAME This application claims the benefit of Provisional Application No. 60/403,420, filed Aug. 14, 2002.

FIELD OF THE INVENTION

The invention relates generally to the field of optical elements, such as but not limited to lenses, and more particularly to optical elements for use in connection with radiation in the infrared portion of the electromagnetic spectrum, as well as to methods for making such optical elements. The optical elements may be used for a number of well-known applications, including but not limited to photography, night vision systems, and other applications as will be apparent to those skilled in the art.

BACKGROUND OF THE INVENTION

Devices for sensing radiation in the infrared portion of the electromagnetic spectrum are used in a number of applications, including photography, night vision systems, and others as will be apparent to those skilled in the art. One problem that arises in connection with such devices is the cost of fabricating optical elements, such as, but not limited to, lenses, for such devices. Glasses that are typically used in connection with optical devices for use in the visual portion of the spectrum are typically not useful in devices for use in the infrared portion of the spectrum, since they tend to largely reflect the infrared radiation incident thereon.

Instead of glasses that are used for optical elements for optical devices that are used in the visual portion of the spectrum, typically crystals of materials such as silicon or germanium are used, which are ground and polished to provide the contours that are required for the desired optical characteristics such as focal length. Fabricating the crystalline material for use in such optical elements, and grinding and polishing the crystalline material into the optical elements, is relatively expensive, and the cost of optical elements for devices for sensing radiation in the infrared portion of the electromagnetic spectrum is a substantial portion of the total cost of such devices.

SUMMARY OF THE INVENTION

The invention provides new and improved optical elements, such as, but not limited to, lenses, for use in connection with devices for sensing radiation in the infrared portion of the electromagnetic spectrum, along with a method for making same.

In brief summary, in one aspect, the invention provides an optical element that provides good transmission of radiation in the infrared portion of the electromagnetic spectrum, that can be molded using an injection molding technique. The optical element comprises a moldable matrix in which is distributed a plurality of particles. The material comprising the matrix is selected so as to have a relatively low absorption of radiation in the infrared portion of the electromagnetic spectrum, and the material comprising the particles is selected to have a relatively high transmissivity of radiation in the infrared portion of the electromagnetic spectrum, and both materials are selected so as to have approximately the same index of refraction. The optical element comprising the matrix/particle composite is formed to provide surfaces having the contours that are required to provide the desired optical properties.

In another aspect, the invention provides a method of making an optical element, such as, but not limited to, a lense, that provides good transmission of radiation in the infrared portion of the electromagnetic spectrum. The method comprises the steps of providing a mold having contours that would provide the optical element with the desired optical properties, providing a plurality of particles within the interior of the mold, and providing a matrix material in fluid form, and thereafter allowing the matrix material to solidify, after which it can be removed from the mold. The material comprising the matrix is selected so as to have a relatively low absorption of radiation in the infrared portion of the electromagnetic spectrum when the material is in the solid state, and the material comprising the particles is selected to have a relatively high transmissivity of radiation in the infrared portion of the electromagnetic spectrum, and both materials are selected so as to have approximately the same index of refraction.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 1, comprising FIGS. 1A, 1B and 1C, schematically depicts an optical element, illustratively in the form of a convex lens, for use in connection with a device for sensing electromagnetic radiation in the infrared portion of the spectrum, constructed in accordance with the invention, FIG. 1A being an axial view of the optical element, FIG. 1B comprising a section along section line B—B in FIG. 1A, and FIG. 1C schematically depicts a detail of a portion of one embodiment of the optical element depicted in FIGS. 1A and 1B; and FIG. 2 shows a cross section of an alternative optical element with mechanical retaining features.

DETAILED DESCRIPTION OF AN ILLUSTRATIVE EMBODIMENT

FIG. 1, comprising FIGS. 1A and 1B, schematically depicts an optical element, illustratively in the form of a lens 10, for use in connection with a device for sensing electromagnetic radiation in the infrared portion of the spectrum, constructed in accordance with the invention. It will be appreciated that the optical element may actually comprise any kind of optical element that may be useful in facilitating the transfer of the radiation from one side of the element to another, including but not limited to windows, cylinders, elements having aspherical surfaces, optical surfaces, and the like. With reference to the illustrative lens, FIG. 1A comprises a view of lens 10 along an optical axis (not shown), and FIG. 1B comprises a sectional view of lens 10 along a section line "B—B" in FIG. 1A. The illustrative lens 10 is a convex lens, specifically including two convex surfaces with a forward surface 10F, a rear surface 10R and a rim 10M. It will be appreciated that the particular configuration of the lens may be different than that of lens 10, and, indeed, a lens constructed in accordance with the invention may have two concave surfaces, one convex surface and one concave surface, or a concave or convex surface and one flat surface.

The lens 10 comprises a polymer matrix 11 that operates as a binder to support and hold a plurality of particles that are generally identified by reference numeral 12. The polymer matrix 11 preferably comprises a material that exhibit low absorption of radiation in the infrared portion of the spectrum, that can be molded using injection molding techniques. Illustrative materials include for example materials such as high-density polyethylene, polysulfone, and other materials as will be apparent to those skilled in the art.

The particles 12 are preferably small pieces of infrared transmitting materials such as silicon, germanium or chalcegonide glasses, sodium chloride, or other materials as will be described below. (In the FIGs., the particles 12 are depicted in solid black to differentiate them from the matrix 11, but it will be appreciated that the particles may be any color, in respect of electromagnetic radiation at wavelengths that are visible to the human eye.) The type of material of which the particles 12 are formed is selected so that the index of refraction of the particles for radiation in the infrared portion of the spectrum substantially corresponds to the index of refraction of the material comprising the polymer matrix 11. In addition, the type of material of which the particles 12 are formed is selected to have a high degree of transmission of electromagnetic radiation in the infrared portion of the spectrum. Illustrative candidates for the material comprising the matrix 11 and particles 12 will be described below. Since the materials comprising the matrix 11 and the particles 12 are selected so that indices of refraction are substantially similar, the particles need not be of any particular shape, and, in addition, the shapes of the various particles need not be the same. In addition, their sizes need not be uniform. However, in one embodiment, the particles are generally spherical and on the order of 100 $\mu$m (micrometers) or larger to minimize diffraction effects that may arise from aperture effects in connection with smaller particles.

The particles 12 are preferably distributed relatively uniformly throughout the polymer matrix 11. The particles 12 may be densely distributed throughout the matrix 11, in which case the polymer matrix 11 will be relatively sparse. In that case, since the transmissivity infrared radiation of the material comprising the particles 12 is relatively good in comparison to the transmissivity of the polymer comprising the matrix 11, the transmissivity of the lens will be relatively good. However, since the polymer matrix 11 is relatively sparse, the physical strength of the lens may be lower than otherwise. On the other hand, the particles 12 may be rather sparsely distributed throughout the matrix 11, in which case the lens may be physically stronger, but the somewhat lower transmissivity of the polymer may result in a lens of lower transmissivity. Typically, the material comprising the particles 12 will have a higher transmissivity of radiation in the infrared portion of the electromagnetic spectrum than will the polymer comprising the matrix 11, and it will be appreciated that the transmissivity of the lens 10 will depend on the relative transmissivities of the polymer comprising the matrix and the material comprising the particles, as well as the relative proportions of them in the lens.

As noted above, the materials comprising the matrix 11 and the particles 12 are selected so that indices of refraction are substantially similar. The following are illustrative combinations of materials for the matrix 11 and particles 12, along with their indices of refraction (IoR):

|  | Matrix | Particles | IoR (Matrix) | IoR (Particles) |
| --- | --- | --- | --- | --- |
| (i) | HDPE | NaCl | 1.52 | 1.49 |
| (ii) | HDPE | KBr | 1.52 | 1.52 |
| (iii) | PFTE | BaFl | 1.44 | 1.45 |
| (iv) | PFTE | KCl | 1.44 | 1.45 |
| (v) | Polysulfone | CeBr | 1.635 | 1.66 |
| (vi) | Polysulfone | $Ca_5(PO_4)_3$ | 1.635 | 1.63 |
| (vii) | Polystyrene | NaCl | 1.55 | 1.49 |

(Key: "HDPE" represents High Density PolyEthylene, "PFTE" represents PolyFluoroTetraEthylene, "NaCl" represents sodium chloride, "KBr" represents potassium bromide, "BaFl" represents barium fluoride, "CeBr" represents cesium bromide, and "$Ca_5(PO_4)_3$" represents calcium phosphate. It will be appreciated that, although particular chemical formulas are depicted in the above table, corresponding materials with other formulas may find utility also or instead of the ones indicated. In any case, it will be appreciated from the following that the material that is to comprise the particles 12 will remain solid at temperatures at which the material that is to comprise the matrix 11 will melt.)

The lens 10 is fabricated using an injection molding technique. As is conventional, a mold is initially formed with the desired contours to provide the forward and rear surfaces 10F and 10R. In addition the particles 12 are fabricated using conventional techniques. Thereafter, the material selected to comprise the matrix 11 is melted and the particles 12 mixed therein, and the combination injected into the mold. Thereafter, the composite is allowed to cure in a conventional manner, until the polymer hardens sufficiently, after which the mold can be open and the lens 10 removed. As noted above, the material that is to comprise the particles 12 is preferably selected so as to remain solid at temperatures at which the material that is to comprise the matrix 11 will melt so that the particles will remain solid during the injection molding process.

The invention provides a number of advantages. In particular, the invention provides a new optical element, such as a lens 10, and a method for manufacturing same, for use in connection with radiation in the infrared portion of the electromagnetic spectrum that is relatively inexpensive to fabricate, thereby to facilitate production of less expensive devices for sensing infrared radiation.

It will be appreciated that numerous changes and modifications may be made to the lens 10 and the method of manufacturing same. For example, although specific materials have been identified for the polymer comprising the matrix 11, and for the particles 12, it will be appreciated that other materials may be used. It is preferable that the material that is selected for the matrix 11 be moldable using any convenient injection molding technique, and that it have low absorption of radiation in the infrared portion of the electromagnetic spectrum. It is also preferable that the material that is selected for the particles 12 have high transmissivity of radiation in the infrared portion of the electromagnetic spectrum. And it is further preferable that the index of refraction of the materials that are selected for the matrix 11 and particles 12 have approximately the same index of refraction.

Moreover, since the optical element is molded, it will be appreciated that various mechanical features that may not be associated with the optical transmission of the element may be molded to the optical element during the molding procedure. For example, contemporaneously with the molding of the optical element itself, mechanical features that can be useful in mounting the optical element in a mounting structure may be molded to the optical element contemporaneously with the molding of the optical element, or subsequent thereto. An example is shown in FIG. 2, in which a dome-shaped lens optical element 10' has an outer flange portion 14 that engages the inner distal surface of a cone-shaped housing 16.

A further modification will be described in connection with FIG. 1C. That FIG. depicts a detail of a lens, in particular depicting a particle 12 embedded in the matrix 11. In the embodiment depicted in FIG. 1C, the particle 12 is depicted as being provided with a coating 13. The coating is provided to correct for a mismatch between the index of refraction of the material comprising the particle 12 and the index of refraction of the material comprising the matrix 11. If the particle 12 is provided with a coating of on the order of one-fourth the wavelength of the infrared electromagnetic radiation for which the lens 10 is to be used, the index of refraction of the material comprising the coating 13 is preferably selected to be on the order of the square root of the multiplicative product of the index of refraction of the material comprising the matrix 12 and the index of refraction of the particle 12, that is $IoR_C = \sqrt{(IoR_P)(IoR_M)}$, where "IoR" refers to "index of refraction" and subscripts "C," "P" and "M" refer to "coating," "particle" and "matrix," respectively.

As an alternative to using a coating 13 to correct for possible mismatches in the indices of refraction of the material comprising the particles 12 and the material comprising the matrix 11, one or both of them may be doped with a chemical to alter the index of refraction of one or both materials so that the indices of refraction of the particles and matrix are compatible. It will be appreciated that both coating the particles 12, and well as doping of one or both of the materials comprising the particles 12 and/or matrix 11 may be used as appropriate to obtain compatibility between the indices of refraction materials of the particles 12 and matrix 11.

In addition, it will be appreciated that, since the optical element comprises particles 12 embedded in the matrix 11, various thermal and optical properties of the optical element can be adjusted by selection of the properties of the materials comprising the particles 12 and matrix 11. For example, the index of refraction for many types of materials is a function of the wavelength of the electromagnetic radiation incident thereon. For a lens or other optical element that is to be used in an application in which a scene is viewed using electromagnetic radiation comprising a range of wavelengths, similar to a "color" application for electromagnetic radiation in the visible spectrum, this can result in dispersion. When dispersion occurs, the image recorded at a particular distance from the optical element may be slightly fuzzy and out of sharp focus, because the ranges of wavelengths of radiation reflected off the scene will generally have associated ranges of focal lengths. To reduce or eliminate the dispersion, the materials comprising the particles 12 and the matrix 11 can be selected so as to have differing and possibly complimentary or inverse indices of refraction as a function of wavelength. That is, for example, if the material comprising the matrix 11 is selected so as to have an index of refraction that increases with increasing wavelength, the material comprising the particles 12 can be selected so as to have an index of refraction that decreases with increasing wavelength. Similarly, if the material comprising the matrix 11 is selected so as to have an index of refraction that decreases with increasing wavelength, the material comprising the particles 12 is selected so as to have an index of refraction that increases with increasing wavelength. If the rate of change of the materials' indices of refraction is generally the same in magnitude, but complementary in direction, the amount of dispersion that the optical element may exhibit can be reduced.

Similarly, the materials comprising the matrix 11 and the particles 12 can be selected to minimize changes in physical size of the optical element as a function of temperature, by appropriate selection of the materials' coefficients of thermal expansion. If, for example, the material comprising the matrix 11 has a positive coefficient of thermal expansion, the material comprising the particles 12 can be selected to have a negative coefficient of thermal expansion, the physical dimensions of the optical element can be maintained relatively stable.

In addition, the various optical properties of the optical element can be manipulated by providing that the materials comprising the particles 12 will have indices of refraction that change as a function of position along any of the axes of the optical element. For example, the materials can be selected so that the indices of refraction can have indices of refraction that increase or decrease as a function of position from front to rear of the optical element, from bottom to top, or along any other axis or combination of axes. Similarly, the thermal properties of the optical element can be manipulated in a similar manner. That is, the materials comprising the particles 12 can be selected so that their coefficients of thermal expansion can increase or decrease as a function of position from front to rear of the optical element, from bottom to top, or along any other axis or combination of axes.

As described above in connection with FIG. 1C, the particles 12 can be provided with a coating. As a further modification, one or more of the surfaces of the optical element can be provided with one or more coating layers to, for example, compensate for surface uniformities, provide for structural stability, or for any other purposes as will be apparent to those skilled in the art. For example, if a water soluble material, such as sodium chloride, is selected for the particles, it may be advantageous to provide a layer of a coating material that would suffice to prevent water from contacting particles 12 that may otherwise be at the surface of the optical element, and, accordingly, might dissolve if they were exposed to water. Coatings for other purposes, such as to provide protection against attack by other types of materials, to provide certain optical properties, and so forth, will be apparent to those skilled in the art. An example of such a coating is shown in FIG. 1B at reference 18.

In addition, as noted above, although the invention has been specifically described in FIGS. 1A through 1C in connection with a lens, it will be appreciated that the invention encompasses other types of optical elements may be provided, including, but not limited to, windows, cylinders, elements having non-uniform and/or aspherical surfaces, and the like.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An optical element that provides good transmission of radiation in a short-wavelength infrared portion of the electromagnetic spectrum having wavelengths sufficiently short that minimal diffraction effects occur when the radiation encounters an aperture of 100 microns, the optical element comprising a solid matrix in which is distributed a plurality of solid particles, the material of the matrix being selected so as to have a relatively low absorption of radiation in the short-wavelength infrared portion of the electromagnetic spectrum, and the material of the particles being selected to have a relatively high transmissivity of radiation in the short-wavelength infrared portion of the electromagnetic spectrum, and both materials being selected so as to have approximately the same index of refraction for radiation in the short-wavelength infrared portion of the electromagnetic spectrum, the particles being distributed sufficiently densely in the matrix to provide the optical element with a desired high transmissivity in the short-wavelength infrared portion of the electromagnetic spectrum with a sufficient amount of the matrix material to provide a desired degree of physical strength, the optical element comprising the matrix/particle composite being formed to provide surfaces having the contours that are required to provide the desired optical properties.

2. An optical element as defined in claim 1, the optical element being fabricated using a selected injection molding technique.

3. An optical element as defined in claim 1, at least some of the particles being provided with a coating of a material selected to provide an approximate match between the index of refraction of the particles and the index of refraction of the material comprising the matrix.

4. An optical element as defined in claim 1 in which the optical element is in the form of a lens having front and rear surfaces having selected curved contours.

5. An optical element as defined in claim 1 in which the optical element is in the form of a window.

6. An optical element as defined in claim 1 in which the optical element is in the form of a cylinder.

7. An optical element as defined in claim 1 in which the optical element includes at least one aspherical surface.

8. A An optical element as defined in claim 1 in which the optical element further includes at least one non-optical mechanical element molded thereto.

9. An optical element as defined in claim 1 in which the particles comprise at least two materials having respective indices of refraction, the particles being arranged in the matrix so that the indices of refraction of the respective particles provide, in combination with the index of refraction of the material of the matrix, at least one selected optical effect.

10. An optical element as defined in claim 1 in which the particles comprise at least two materials having respective coefficients of thermal expansion, the particles being arranged in the matrix so that the coefficients of thermal expansion of the respective particles provide, in combination with the coefficient of thermal expansion of the matrix, at least one selected thermal expansion effect.

11. An optical element as defined in claim 1 in which the materials of the particles and the matrix are selected so as to have indices of refraction that change inversely as a function of wavelength.

12. An optical element as defined in claim 1 in which the materials of the particles and the matrix are selected so as to have coefficients of thermal expansion that change inversely as a function of temperature.

13. An optical element as defined in claim 1 further comprising a coating layer applied to at least one of said surfaces.

14. An optical element as defined in claim 13 in which the coating layer comprises a material having at least one selected optical property.

15. An optical element as defined in claim 1 in which the optical properties of the optical element are manipulated such that the materials constituting the particles have indices of refraction that change as a function of position along at least one of the axes of the optical element.

16. An optical element as defined in claim 15 in which the indices of refraction of the particles increase as a function of position from front to rear of the optical element.

17. A method of making an optical element that provides good transmission of radiation in a short-wavelength infrared portion of the electromagnetic spectrum having wavelengths sufficiently low that minimal diffraction effects occur when the radiation encounters an aperture of 100 microns, the method comprising the steps of:

providing a mold having contours that would provide the optical element with the desired optical properties;

providing a plurality of solid particles formed from a material selected to have a relatively high transmissivity of radiation in the short-wavelength infrared portion of the electromagnetic spectrum;

providing a matrix material in fluid form, the material comprising the matrix is selected so as to have a relatively low absorption of radiation in the short-wavelength infrared portion of the electromagnetic spectrum when the material is in the solid state, the material of the particles and the material of the matrix being selected so as to have approximately the same index of refraction for radiation in the short-wavelength infrared portion of the electromagnetic spectrum, the particles being distributed sufficiently densely in the matrix to provide the optical element with a desired high transmissivity in the short-wavelength infrared portion of the electromagnetic spectrum while the matrix provides a desired degree of physical strength;

and thereafter:

mixing the particles in the fluid form of the matrix material to form a composite material;

injecting the composite material into the mold; and allowing the injected composite material to solidify to form the optical element.

18. A method as defined in claim 17 further comprising the step of removing the optical element from the mold.

19. A method as defined in claim 17 further comprising the step of providing at least some of the particles with a coating of a material selected to provide an approximate match between the index of refraction of the particles and the index of refraction of the material of the matrix.

20. A method as defined in claim 17 further comprising the step of molding at least one non-optical mechanical element to the optical element.

21. A method as defined in claim 17 the particles comprising at least two materials having respective indices of refraction, the method further comprising the step of arranging the particles in the mold so that their indices of refraction, in combination with the index of refraction of the material of the matrix, provide at least one selected optical effect.

22. A method as defined in claim 17 the particles comprising at least two materials having respective coefficients of thermal expansion, the method further comprising the step of arranging the particles in the mold so that their coefficients of thermal expansion, in combination with the coefficient of thermal expansion of the material of the matrix, provide at least one selected thermal effect.

23. A method as defined in claim 17 further comprising the step of applying a coating to at least one of said surfaces.

* * * * *